March 24, 1931.   F. TYRRELL   1,797,251
COMBINATION FISHING TACKLE AND NET
Original Filed April 24, 1929
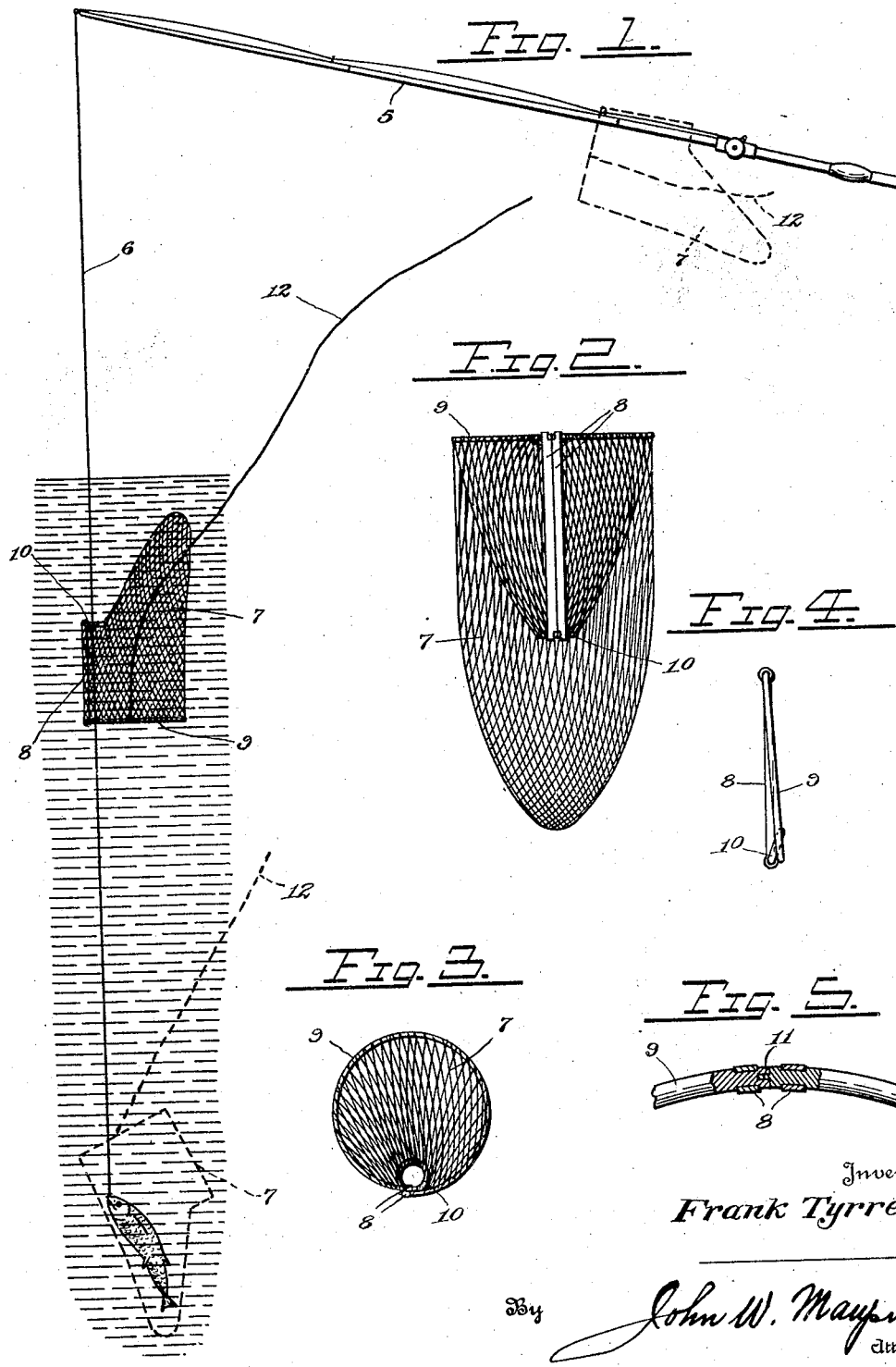

Patented Mar. 24, 1931

1,797,251

UNITED STATES PATENT OFFICE

FRANK TYRRELL, OF SEATTLE, WASHINGTON

COMBINATION FISHING TACKLE AND NET

Application filed April 24, 1929, Serial No. 357,843. Renewed May 26, 1930.

My invention relates to combination fishing tackles and nets and the primary objects of the invention are to provide a net embodying means whereby same may be readily slipped over the fishing tackle and slidably lowered on the line to envelop and raise a fish that has been caught on the hook of the tackle. My device embodies means for retaining the net in slidable engagement with the fish line, means for readily installing and disengaging the net from the line, and means for turning the net over and hauling it back after a fish has been entrapped therein.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:

Figure 1 is a view in side elevation showing a fish pole and line having my net installed thereon for illustrating the method of catching a fish therewith;

Fig. 2 is a view in front elevation of the net;

Fig. 3 is a top plan view of the same;

Fig. 4 is a view in side elevation of the foldable frame for the net; and

Fig. 5 is a fragmentary plan and section view showing the joint or connection of the net frame whereby it is adapted to be opened and installed on the fishing tackle.

Referring to the drawings throughout which like reference numerals designate like parts, the numeral 5 indicates the ordinary fish rod having the usual line 6. My device comprises a net 7 which I prefer to make in the shape illustrated although it will be understood that same may be made in most any form that is adapted to my purpose.

The frame for the net 7 comprises a pair of corresponding ribs 8 that are preferably adapted to fit longitudinally together in snug engagement when the device is in its closed or installed position as clearly shown in Fig. 2 of the drawings.

A relatively large ring or hoop 9 has its abutting ends swiveled or otherwise pivotally secured to the outer ends of the ribs 8 as shown in Fig. 5, and a relatively small ring 10 has its abutting ends correspondingly secured to the inner or opposite ends of said ribs.

It will thus be obvious that the frame is foldable and the larger ring 9 and smaller ring 10 may be pivotally moved inward against the ribs 8 as shown in Fig. 4. Sufficient friction is provided in said pivotal connections so that the rings will remain in whatever pivotal position they may be placed.

The rings 9 and 10 are made of spring wire and, by virtue of their spring tension, their abutting ends are adapted to normally overlap as shown in Fig. 3. The compressive spring tendency of said rings alone will therefore retain the net in a closed position, although I prefer to provide one end of each of said rings with a reduced projection, as shown at 11 in Fig. 5, which is arranged to fit in a corresponding hole in its associated end and held therein by the contractile force of said spring rings to serve as a more desirable closure means for said rings.

The net 7 is secured to the ribs 8 and to the rings 9 and 10 thus leaving its mouth open as defined by the ring 9, and also leaving a small opening at its mid portion as defined by the ring 10.

In describing the practical use of my device it will be assumed that a fish is caught on the hook which is too powerful to be landed by the ordinary fishing tackle. The net is therefore slipped over the pole 5 or the line 6 by spreading apart the ribs 8 which will immediately spring together.

The net will slidably move down the line mouth first and its downward movement through the water will retain the net in a spread condition. Upon reaching the end of the fish line the net will envelop the fish and will be prevented from going further down by reason of the restricted opening as defined by the ring 10.

The fish now being enmeshed in the net may be landed by hauling in on the pull back line 12 which is secured to the large ring 9 and the net will thereby be turned over at the beginning of its upward movement as will be understood.

It will now be apparent that I have provided a net that is foldable and handy to carry, which may be readily installed for use on a fishing tackle, which is direct and effective in preventing the loss of fish after they have been hooked, and which will save fishing tackle by preventing same from being carried away, broken or otherwise damaged by large or game fish.

Having thus described my invention, it being understood that minor changes may be resorted to in its construction without departing from its scope and spirit, what I claim and desire to secure by Letters Patent of the United States is:—

1. The combination with a fishing tackle, of a net slidably mounted thereon, and a pull back line for the net.

2. The combination with a fishing tackle, of a net and frame slidably mounted on the tackle, foldable means for the frame and net, and a pull back line for the net.

3. The combination with a fishing tackle, of a net and frame, means for detachably retaining the net in slidable engagement with the tackle, a pull back line for the net, and foldable means for the frame.

In witness whereof, I hereunto subscribe my name this 14th day of March, A. D. 1929.

FRANK TYRRELL.